United States Patent
Zhang et al.

(10) Patent No.: US 8,891,705 B1
(45) Date of Patent: Nov. 18, 2014

(54) METHODS FOR SIGNAL PROCESSING TO REDUCE INTER-SYMBOL-INTERFERENCE

(71) Applicant: Amlogic Co., Ltd., Santa Clara, CA (US)

(72) Inventors: Jinhong Zhang, Santa Clara, CA (US); Jin Niu, Shanghai (CN)

(73) Assignee: Amlogic Co., Ltd., Santa Clara, CA (US)

( * ) Notice: Subject to any disclaimer, the term of this patent is extended or adjusted under 35 U.S.C. 154(b) by 0 days.

(21) Appl. No.: 14/010,441

(22) Filed: Aug. 26, 2013

(51) Int. Cl.
*H04L 25/08* (2006.01)
*H04L 25/03* (2006.01)
*H04B 1/12* (2006.01)

(52) U.S. Cl.
CPC .............. *H04L 25/03178* (2013.01); *H04B 1/12* (2013.01)
USPC ........... 375/348; 375/148; 375/285; 455/506; 455/67.11

(58) Field of Classification Search
USPC ......... 375/148, 260, 267, 285, 346–350, 354; 455/501, 504, 506, 65, 67.11, 225, 455/226.1, 296
See application file for complete search history.

(56) References Cited

U.S. PATENT DOCUMENTS

| | | | |
|---|---|---|---|
| 2004/0091057 A1* | 5/2004 | Yoshida | 375/260 |
| 2007/0177685 A1* | 8/2007 | Kawauchi | 375/260 |
| 2010/0061223 A1* | 3/2010 | Kim et al. | 370/208 |
| 2011/0026652 A1* | 2/2011 | Kent et al. | 375/346 |
| 2012/0307944 A1* | 12/2012 | Takagi et al. | 375/340 |
| 2013/0022090 A1* | 1/2013 | Weng et al. | 375/219 |

\* cited by examiner

*Primary Examiner* — Dac Ha
(74) *Attorney, Agent, or Firm* — Venture Pacific Law, PC

(57) ABSTRACT

A method for processing a signal by a receiver, comprises the steps of: receiving the signal by the receiver, calculating one or more symbols based on the received signal; determining a multipath delay spread from the received signal; rebuilding one or more of the calculated symbols as a function of the multipath delay spread; and processing the rebuilt symbols for decoding by the receiver.

17 Claims, 4 Drawing Sheets

METHODS FOR SIGNAL PROCESSING TO REDUCE INTER-SYMBOL-INTERFERENCE

FIELD OF INVENTION

This invention relates to methods for signal processing, and, in particular, to methods for inter-symbol-interference ("ISI") reduction of an orthogonal frequency-division multiplexing ("OFDM") signal.

BACKGROUND

In a communications system, a transmitter sends data to a receiver through a channel. In the case of a wireless channel, the transmitted waveforms suffer from multipath fading due to reflection, refraction, and diffraction, which ultimately results in inter-symbol-interference between transmitted symbols of the signal. This is particularly problematic for modern broadband wireless communications systems, e.g., OFDM systems, which offer high data rate services. Particularly for such high data rate systems, multipath fading is especially difficult to mitigate.

Many current communications systems mitigate ISI by using a cyclic prefix ("CP") for each transmitted symbol. The CP is a copy of the latter portion of a transmitted symbol that is prepended to the transmitted symbol. The CP acts as a buffer region where delayed information for the previous symbol can be stored by the receiver. The receiver has to exclude all the samples from the CP since those samples can be corrupted by the previous symbol. Furthermore, the CP interval length can vary to accommodate different multipath environments. Typically, the CP interval length is determined by the expected duration of the multipath channel in the operating environment. As such, a DVB-T system has been configured to have four different CP intervals, including ¼, ⅛, ¹⁄₁₆ and ¹⁄₃₂. However, the multipath delay can be longer than these set intervals causing unreliable decoding of the signal.

FIG. 1 illustrates symbols of an OFDM signal, where each of the symbols has a cyclic prefix. Symbols m−1, m, and m+1 for a single carrier of the OFDM signal can be transmitted sequentially in the time domain. The symbol m comprises a cyclic prefix 10 having $N_{CP}$ points and a body 12 having N points. The CP 10 is discarded to avoid any ISI to the symbol m from the previous symbol m−1. However, when a multipath delay spread for the signal is greater than the CP 10 length, the ISI will affect the body 12 of the symbol m, causing the data in the symbol m to be unreliable.

Therefore, it is desirable to provide new methods and systems for processing a signal to improve the reception of the signal even when the multipath delay spread is greater than the length of a CP for the signal.

SUMMARY OF INVENTION

An object of this invention is to provide methods and systems for signal processing to reduce ISI for a multipath delay spread that exceeds a cyclic prefix length for a received signal.

Another object of this invention is to provide methods and systems for signal processing to identify a multipath delay spread for a received signal.

Yet another object of this invention is to provide methods and systems for signal processing to estimate the originally transmitted signal without ISI based upon the received signal.

Briefly, the present invention discloses methods and systems for processing a signal by a receiver, comprising the steps of: receiving the signal by the receiver; calculating one or more symbols based on the received signal; determining a multipath delay spread from the received signal; rebuilding one or more of the calculated symbols as a function of the multipath delay spread; and processing the rebuilt symbols for decoding by the receiver.

An advantage of this invention is that methods and systems for signal processing are provided to reduce ISI for a multipath delay spread that exceeds a cyclic prefix length for a received signal.

Another advantage of this invention is that methods and systems for signal processing are provided to identify a multipath delay spread for a received signal.

Yet another advantage of this invention is that methods and systems for signal processing are provided to estimate the originally transmitted signal without ISI based upon the received signal.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Figure 1:
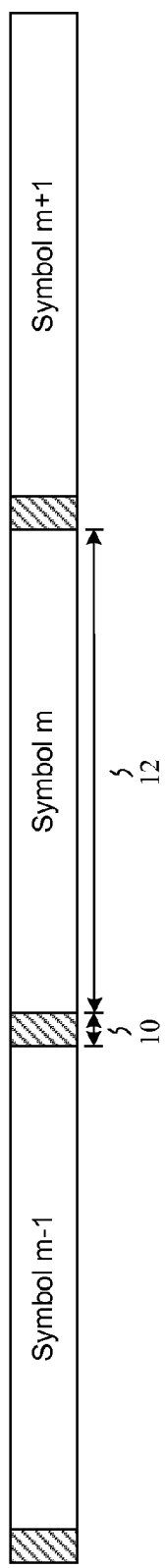
FIG. 1 illustrates symbols of an OFDM signal, where each of the symbols has a cyclic prefix.
Figure 2:
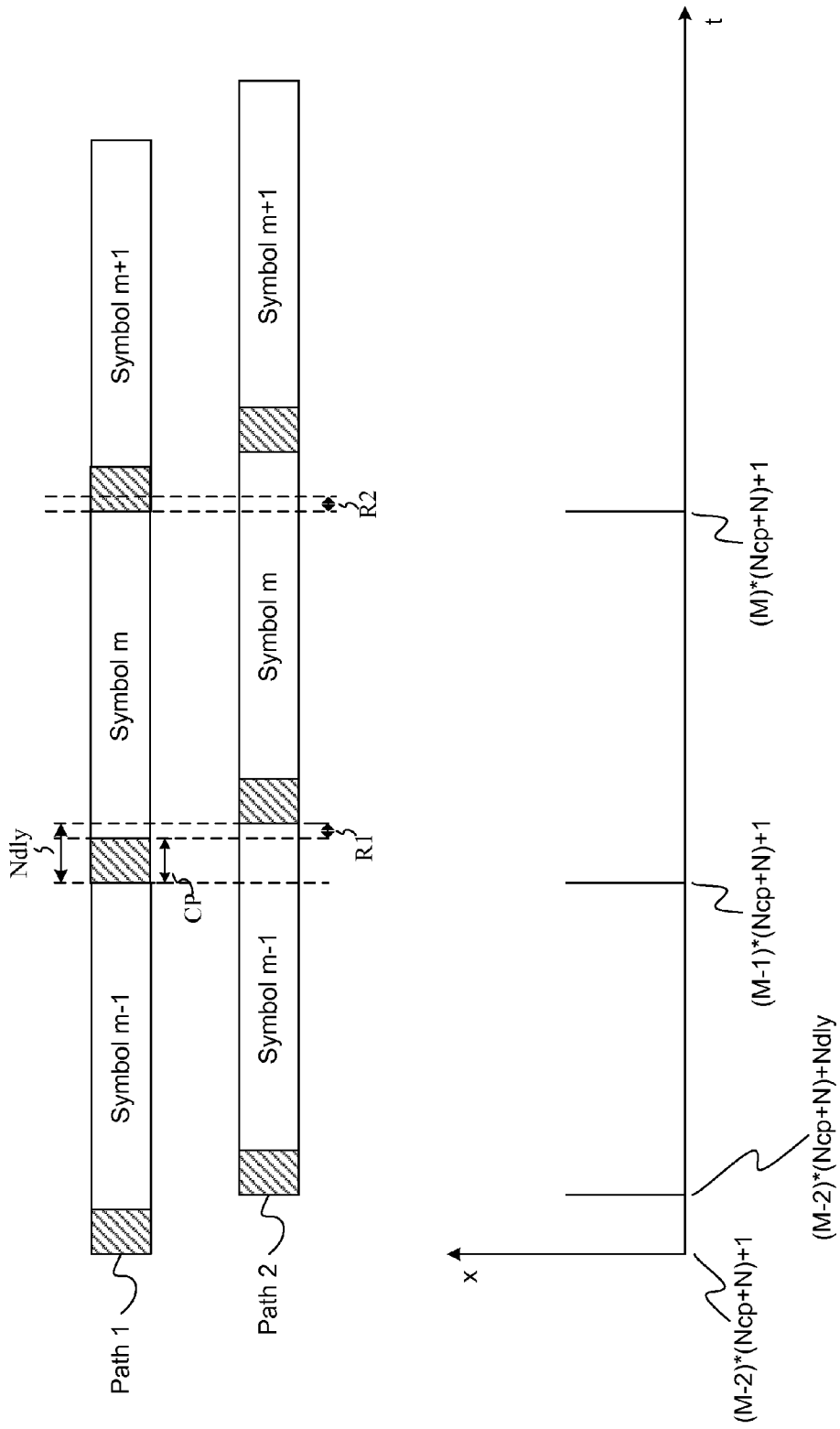
FIG. 2 illustrates timing diagrams for symbols of an OFDM signal having different paths to a receiver for the OFDM signal.

FIG. 2 illustrates symbols of an OFDM signal having multiple paths to a receiver causing a multipath delay spread. Due to a multipath environment, a signal can take multiple paths to a receiver causing ISI. The symbols of the received signal can be rebuilt to more closely represent the originally transmitted symbols based upon the received signal. The rebuilding step can eliminate the various components of the received signal that can be due to the multipath environment. Thus, the rebuilt symbols of the signal can more accurately reflect the original transmitted symbols by reducing the effects of ISI.

For example, a signal can be transmitted to a receiver, where the signal can take multiple paths to the receiver. The multiple paths can cause a delay in the reception of the signal causing an offset of the signal in the time domain, as illustrated in path 1 and path 2. Path 1 can be the first path and path 2 can be the last path, where there can be many other paths between the first path and the second path. The signal can comprise symbols m−1 to m+1, where each of the symbols has a CP. However, if a multipath delay spread Ndly for the two multipaths, path 1 and path 2, is greater than the CP, then ISI will generally occur since the multipaths are constructively added by the receiver.

The present invention can generally identify the multipath delay spread Ndly, and then use the multipath delay spread Ndly and the received signal to combat ISI. In particular, the multipath delay spread Ndly is used to remove components of the received signal that are due to the path 2 of the signal, including a segment R1 of symbol m−1 from the path 2 and a segment R2 of the symbol m from the path 2. Once these components are estimated and removed, the transmitted symbol can be estimated by the receiver.

Figure 3:
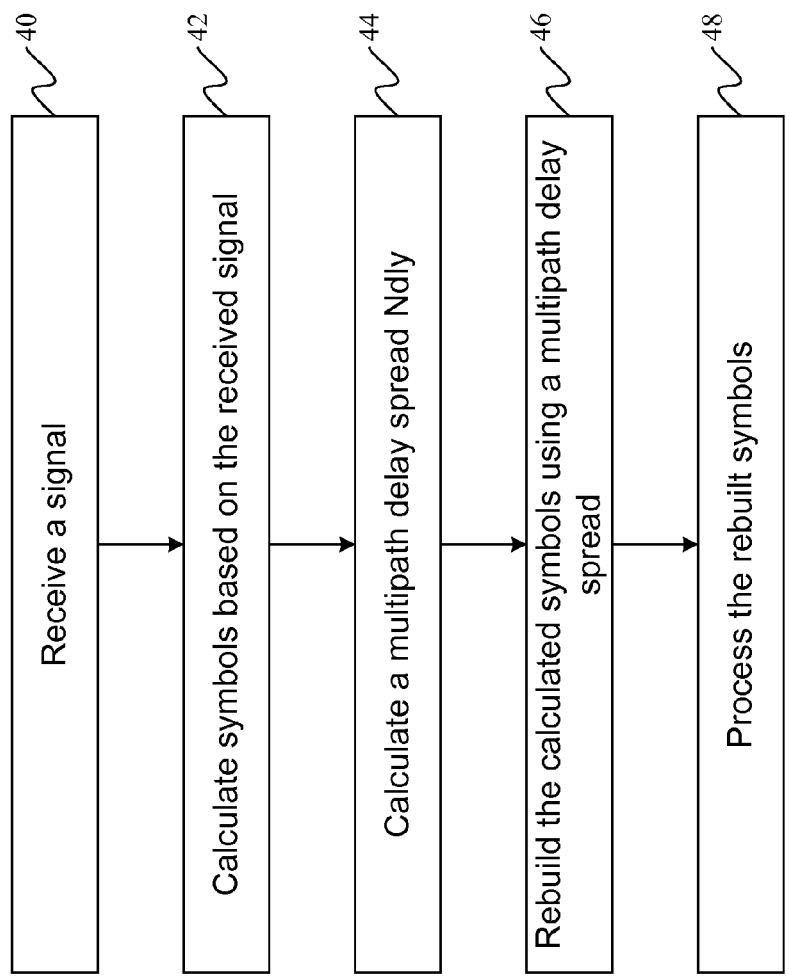
FIG. 3 illustrates a method of the present invention for processing a signal to reduce ISI.

FIG. 3 illustrates a method of the present invention for processing a signal to reduce ISI. A signal y(n) in the time domain can be received 40, where the received signal y(n) may take multiple paths to the receiver. The symbols of the received signal y(n) can be calculated 42. Generally, symbols Y[m,k] in the frequency domain can be obtained from the received signal y(n) by applying a CP removal and a Fast Fourier Transform ("FFT") on the received signal y(n). For instance, the symbols Y[m,k] can be found by the following Equation (1):

$$Y[m,k]=FFT(y[Ncp+1+(N+Ncp)*(m-1):(Ncp+N)*m]) \quad \text{Equation (1)}$$

where Ncp is the sample points of a cyclic prefix, N is the total number of sample points of a body of a symbol, and m is the symbol number. Channel estimation can also be performed to obtain the channel response H[m,k].

Next, the symbols Y[m,k] in the frequency domain and the channel response H[m,k] can be used to estimate the symbols $S_{est}$[m,k], e.g., according to Equation (2). Then, a slicer function (or other hard decision device) can be applied to the results of the symbol estimation $S_{est}$[m,k] to obtain hard decision symbols $S_{dec}$[m,k], e.g., in Equation (3). The hard decision symbols $S_{dec}$[m,k] can be the calculated symbols for this step.

$$S_{est}[m,k]=Y[m,k]/H[m,k] \quad \text{Equation (2)}$$

$$S_{dec}[m,k]=\text{slicer}(S_{est}[m,k]) \quad \text{Equation (3)}$$

A multipath delay spread 44 for the signal can also be calculated by using a noise suppressed channel impulse response power ("CIRP"). To obtain the CIRP, a channel impulse response ("CIR") for the channel is obtained, e.g., according to Equation (4). Next, the CIR is used to calculate the CIRP of the channel, e.g., according to Equation (5). Finally, the CIRP can be filtered by nulling any values for the CIRP lower than a threshold value, giving a $|h_1[n]|^2$ function to represent the CIRP, see Equation (6).

$$h=ifft(H) \quad \text{Equation (4)}$$

where H is the channel frequency response, h is the channel impulse response, and "ifft" or "IFFT" is the Inverse Fast Fourier Transform function.

$$|h[n]|^2 = h\left[\text{mod}\left(n - \frac{N}{2}, N\right)\right] * h\left[\text{mod}\left(n - \frac{N}{2}, N\right)\right]^* \quad \text{Equation (5)}$$

where N>=n>=0, mod is the modulo operator, and N is the total number of samples of the symbol.

$$|h_1[n]|^2 = \begin{cases} |h[n]|^2, & |h[n]|^2 > \text{threshold} \\ 0, & |h[n]|^2 \leq \text{threshold} \end{cases} \quad \text{Equation (6)}$$

A first path position for the calculated CIRP and a last path position for the calculated CIRP can be determined, see Equations (7) and (8). Finally, the number of samples between the last path position and the first path position can be the multipath delay spread, see Equation (9).

$$firstPathPos = \arg \min_n |h_1[n]|^2 > 0 \quad \text{Equation (7)}$$

$$firstPathPos = \arg \max_n |h_1[n]|^2 > 0 \quad \text{Equation (8)}$$

$$Ndly = \text{lastpathpos} - \text{firstpathpos} \quad \text{Equation (9)}$$

Next, the calculated symbols $S_{dec}$[m,k] can be rebuilt 46 to reduce ISI using the calculated multipath delay spread Ndly from step 44. Transmitter side functions can be applied to the calculated symbols $S_{dec}$[m,k] to derive an estimated received signal function in the time domain, $y_R$[m,p]. The estimated received signal function in the time domain $y_R$[m,p] can then be used to rebuild the symbols without ISI by eliminating various components caused by the multipath delay spread Ndly. The rebuilt symbols can then be processed 48 further for decoding.

Symbols can be rebuilt by first applying an IFFT function to the calculated symbols $S_{dec}$[m,k] to obtain equations for the transmitted symbols, e.g., in Equations (10)-(12).

$$\hat{x}_R[m,1+Ncp: N+Ncp]=ifft(S_{dec}[m,1:N]) \quad \text{Equation (10)}$$

$$\hat{x}_R[m,k]=\tilde{x}_R[m,N+k], k=1,2,\ldots,Ncp \quad \text{Equation (11)}$$

$$\hat{x}_R[m,k]=0, k\leq 0 \text{ or } k>N+Ncp \quad \text{Equation (12)}$$

Using the above equations for the transmitted symbols, an estimated received signal in the time domain $y_R$[m,p] can be derived as follows:

$$y_R[m,p]=\Sigma_{tau=1}^{Ndly} h(\tau)*\hat{x}_R(m,p-\tau), p=1,2,\ldots,N+Ncp+Ndly \quad \text{Equation (13)}$$

The estimated received signal function in the time domain $y_R$[m,p] can be used to delete the various components of the multipath for the originally received signal. For instance, the estimated received signal function in the time domain $y_R$[m,p] for the symbol m can comprise a component for the unaffected multipath segment of the symbol m, i.e., the sample points starting after the Ndly sample points to N sample points of the body and another component for the affected multipath segment of the symbol m, i.e., from k=1 to Ndly−Ncp, which may no longer be reliable due to ISI.

The unaffected multipath segment portion of the symbols can be denoted as follows:

$$y_{new}[m,k]=y[(m-1)*(Ncp+N)+Ncp+k] \quad \text{Equation (14)}$$

where k is equal to Ndly−Ncp+1, . . . , N.

The affected multipath segment portion of the symbols can be denoted as follows:

$$y_{new}[m,k] = \begin{pmatrix} y[(m-1)*(Ncp+N)+Ncp+k] \\ +y[m*(Ncp+N)+k] \\ -y_R[m+1,k]-y_R[m-1,N+Ncp+Ncp+k] \end{pmatrix} \quad \text{Equation (15)}$$

where k is equal to 1, 2, . . . , Ndly−Ncp.

The $y_{new}$[m,k] can then be processed as the received signal by receiver. For instance, a FFT function can be applied to the $y_{new}$[m,k] to obtain the frequency domain function of the signal $Y_{new}$. Next, channel estimation can be applied to $Y_{new}$, and further demapping and decoding can be performed to process the rebuilt symbols without ISI.

Figure 4:
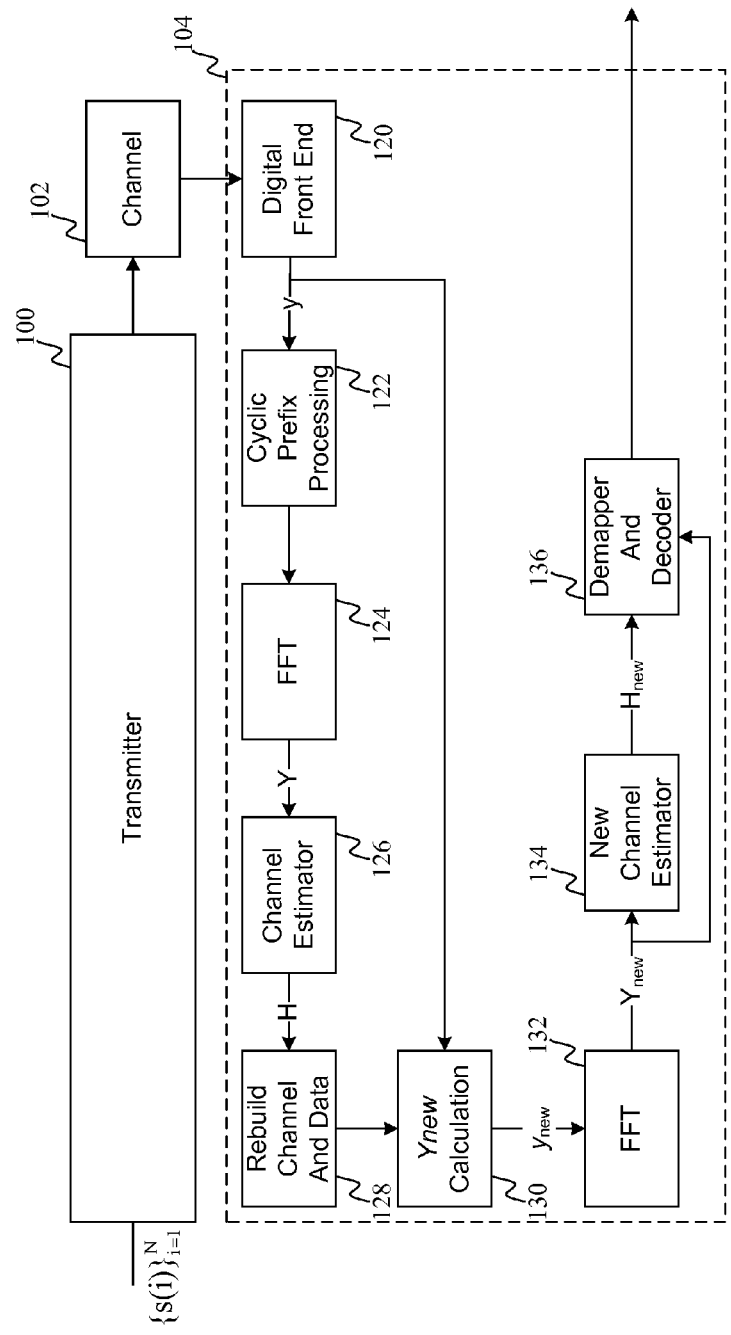
FIG. 4 illustrates a block diagram for a communications system of the present invention to reduce ISI.

FIG. 4 illustrates a block diagram for a communications system of the present invention. A signal is inputted to a transmitter 100 for transmission over a channel 102, e.g., over-the-air wireless channel. The transmission is received by a receiver 104 for processing and decoding.

The receiver 104 can comprise a digital front end block 120, a CP processing block 122, a first FFT block 124, a first channel estimator 126, a rebuild channel and data block 128, a $y_{new}$ calculation block 130, a second FFT block 132, a second channel estimator 134, and a demapper and decoder block 136. In terms of implementation, the first FFT block 124 and the second FFT block 132 can be a single functional block for providing the functionality as further described for each of the FFT blocks 124 and 132. Additionally, the channel estimator 126 and the new channel estimator 134 can be a single functional block for providing the functionality as further described for each of the channel estimators 126 and 134.

The received analog transmission can be processed by the digital front end block 120 for outputting a digital signal y(n) with a certain sampling rate that is ready for baseband processing. The digital signal y(n) is outputted to the CP processing block 122. The CP processing block 122 can remove the CP from the digital signal y(n), and outputs the digital signal y(n) without the CP to the FFT block 124 to apply an N point FFT function on the digital signal y(n). The FFT function converts the time domain signal y(n) to a frequency domain signal Y[m,k]. The signal Y[m,k] is outputted to the channel estimator 126, which performs channel estimation on the signal Y[m,k] to generate a channel frequency response H[m,k]. The channel frequency response H[m,k] is then outputted to the rebuild channel and data block 128.

The rebuild channel and data block 128 generates the estimated received signal in the time domain $y_R[m,p]$, which is outputted to the $y_{new}[m,k]$ calculation block 130 for generating the estimated signal $y_{new}[m,k]$. The rebuild channel and data block 128 can use the signal Y[m,k] and the channel response H[m,k] to determine the symbols $S_{dec}[m,k]$ for the received signal and also calculate the multipath delay spread Ndly. The rebuild channel and data block 128 can have a slicer function to determine the symbols $S_{dec}[m,k]$. Furthermore, the rebuild channel and data block 128 can implement the above Equations [2]-[13].

The $y_{new}[m,k]$ calculation block 130 can also receive the received signal y(n) to generate the estimated signal $y_{new}[m,k]$. The estimated signal $y_{new}[m,k]$ is inputted to the FFT block 132 for further processing to decode the data in the signal. The FFT block 132 applies a FFT to the $y_{new}[m,k]$ to obtain $Y_{new}$, a frequency domain signal of the time domain signal $y_{new}[m,k]$. Next, the signal $Y_{new}$ is further processed by the new channel estimator 134 and the demapper and decoder 136 to decode the received signal.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for processing a signal by a receiver, comprising the steps of:
    receiving the signal by the receiver;
    calculating one or more symbols based on the received signal;
    determining a multipath delay spread from the received signal;
    rebuilding one or more of the calculated symbols as a function of the multipath delay spread, comprising the steps:
        calculating an unaffected multipath segment of the calculated symbol;
        calculating an affected multipath segment of the calculated symbol; and
        generating the rebuilt symbols using the calculated unaffected multipath segment of the calculated symbol and the calculated affected multipath segment of the calculated symbol; and
    processing the rebuilt symbols for decoding by the receiver.

2. The method of claim 1 wherein the received signal having a cyclic prefix, and wherein the rebuilding step further comprises the following steps:
    deriving an estimated signal in the time domain as a function of the calculated symbols, the multipath delay spread, and the cyclic prefix; and
    generating the rebuilt symbols using the derived estimated signal.

3. The method of claim 2 wherein one or more multipath components in the derived estimated signal are removed for generating the rebuilt symbols.

4. The method of claim 2 wherein the derived estimated signal is equal to $$y_{new}[m,k] = \begin{cases} y[(m-1)*(Ncp+N)+Ncp+k], & (k = Ndly-Ncp+1, \ldots, N) \\ \begin{pmatrix} y[(m-1)*(Ncp+N)+Ncp+k] \\ +y[m*(Ncp+N)+k] \\ -y_R[m+1,k]-y_R[m-1,N+Ncp+Ncp+k] \end{pmatrix}, & k=1,2,\ldots Ndly-Ncp \end{cases}$$

where m is a symbol number, Ncp is the number of points for the cyclic prefix, N is the number of points for the body of a symbol, and $y_R$ is the estimated received signal in the time domain.

5. The method of claim 2 wherein a channel impulse response power ("CIRP") is calculated for the signal, wherein if the calculated CIRP is equal to or below a predefined threshold, then the CIRP is given a null value, wherein a first path position is determined as a function of the CIRP and a last path position is determined as a function of the CIRP, and wherein the multipath delay spread is determined as a function of the first path position and the last path position.

6. The method of claim 2 in the rebuilding step, wherein an Inverse Fast Fourier Transform is applied to the calculated symbols to generate a time domain representation of the calculated symbols.

7. The method of claim 1 wherein the unaffected multipath segment of the calculated symbol is calculated starting from a sample point after a multipath delay spread length minus a cyclic prefix plus one to N sample points.

8. The method of claim 1 wherein the affected multipath segment of the calculated symbol is calculated from a first sample point to a sample point equal to a multipath delay spread length minus a cyclic prefix length.

9. A method for processing a signal by a receiver, comprising the steps of:
- receiving the signal by the receiver, wherein the received signal having a cyclic prefix;
- calculating one or more symbols based on the received signal;
- determining a multipath delay spread from the received signal;
- rebuilding one or more of the calculated symbols as a function of the multipath delay spread, comprising the steps:
  - deriving an estimated signal in the time domain as a function of the calculated symbols, the multipath delay spread, and the cyclic prefix; and
  - generating the rebuilt symbols using the derived estimated signal,
  - wherein one or more multipath components in the derived estimated signal are removed for generating the rebuilt symbols; and
- processing the rebuilt symbols for decoding by the receiver,
wherein the derived estimated signal is equal to $$y_{new}[m,k] = \begin{cases} y[(m-1)*(Ncp+N)+Ncp+k], & (k = Ndly - Ncp + 1, \ldots, N) \\ \begin{pmatrix} y[(m-1)*(Ncp+N)+Ncp+k] \\ +y[m*(Ncp+N)+k] \\ -y_R[m+1,k] - y_R[m-1, N+Ncp+Ncp+k] \end{pmatrix}, & k = 1, 2, \ldots Ndly - Ncp \end{cases}$$

where m is a symbol number, Ncp is the number of points for the cyclic prefix, N is the number of points for the body of a symbol, and $y_R$ is the estimated received signal in the time domain.

10. The method of claim 9 wherein a channel impulse response power ("CIRP") is calculated for the signal, wherein if the calculated CIRP is equal to or below a predefined threshold, then the CIRP is given a null value, wherein a first path position is determined as a function of the CIRP and a last path position is determined as a function of the CIRP, and wherein the multipath delay spread is determined as a function of the first path position and the last path position.

11. The method of claim 9 in the rebuilding step, wherein an Inverse Fast Fourier Transform is applied to the calculated symbols to generate a time domain representation of the calculated symbols.

12. A method for processing a signal by a receiver, comprising the steps of:
- receiving the signal by the receiver, wherein the received signal having a cyclic prefix;
- calculating one or more symbols based on the received signal;
- determining a multipath delay spread from the received signal;
- rebuilding one or more of the calculated symbols as a function of the multipath delay spread, comprising the steps:
  - calculating an unaffected multipath segment of the calculated symbol;
  - calculating an affected multipath segment of the calculated symbol; and
  - generating the rebuilt symbols using the calculated unaffected multipath segment of the calculated symbol and the calculated affected multipath segment of the calculated symbol,
  - wherein one or more multipath components of the multipath delay spread are removed from the received signal for generating the rebuilt symbols; and
- processing the rebuilt symbols for decoding by the receiver.

13. The method of claim 12 wherein the unaffected multipath segment of the calculated symbol is calculated starting from a sample point after the multipath delay spread minus a cyclic prefix plus one to N sample points.

14. The method of claim 12 wherein the affected multipath segment of the calculated symbol is calculated from a first sample point to a sample point equal to a multipath delay spread length minus a cyclic prefix length.

15. The method of claim 12 wherein the rebuilt symbols are equal to $$y_{new}[m,k] = \begin{cases} y[(m-1)*(Ncp+N)+Ncp+k], & (k = Ndly - Ncp + 1, \ldots, N) \\ \begin{pmatrix} y[(m-1)*(Ncp+N)+Ncp+k] \\ +y[m*(Ncp+N)+k] \\ -y_R[m+1,k] - y_R[m-1, N+Ncp+Ncp+k] \end{pmatrix}, & k = 1, 2, \ldots Ndly - Ncp \end{cases}$$

where m is a symbol number, Ncp is the number of points for the cyclic prefix, N is the number of points for the body of a symbol, and $y_R$ is the estimated received signal in the time domain.

16. The method of claim 12 wherein a channel impulse response power ("CIRP") is calculated for the signal, wherein if the calculated CIRP is equal to or below a predefined threshold, then the CIRP is given a null value, wherein a first path position is determined as a function of the CIRP and a last path position is determined as a function of the CIRP, and wherein the multipath delay spread is determined as a function of the first path position and the last path position.

17. The method of claim 12 in the rebuilding step, wherein an Inverse Fast Fourier Transform is applied to the calculated symbols to generate a time domain representation of the calculated symbols.

* * * * *